United States Patent Office

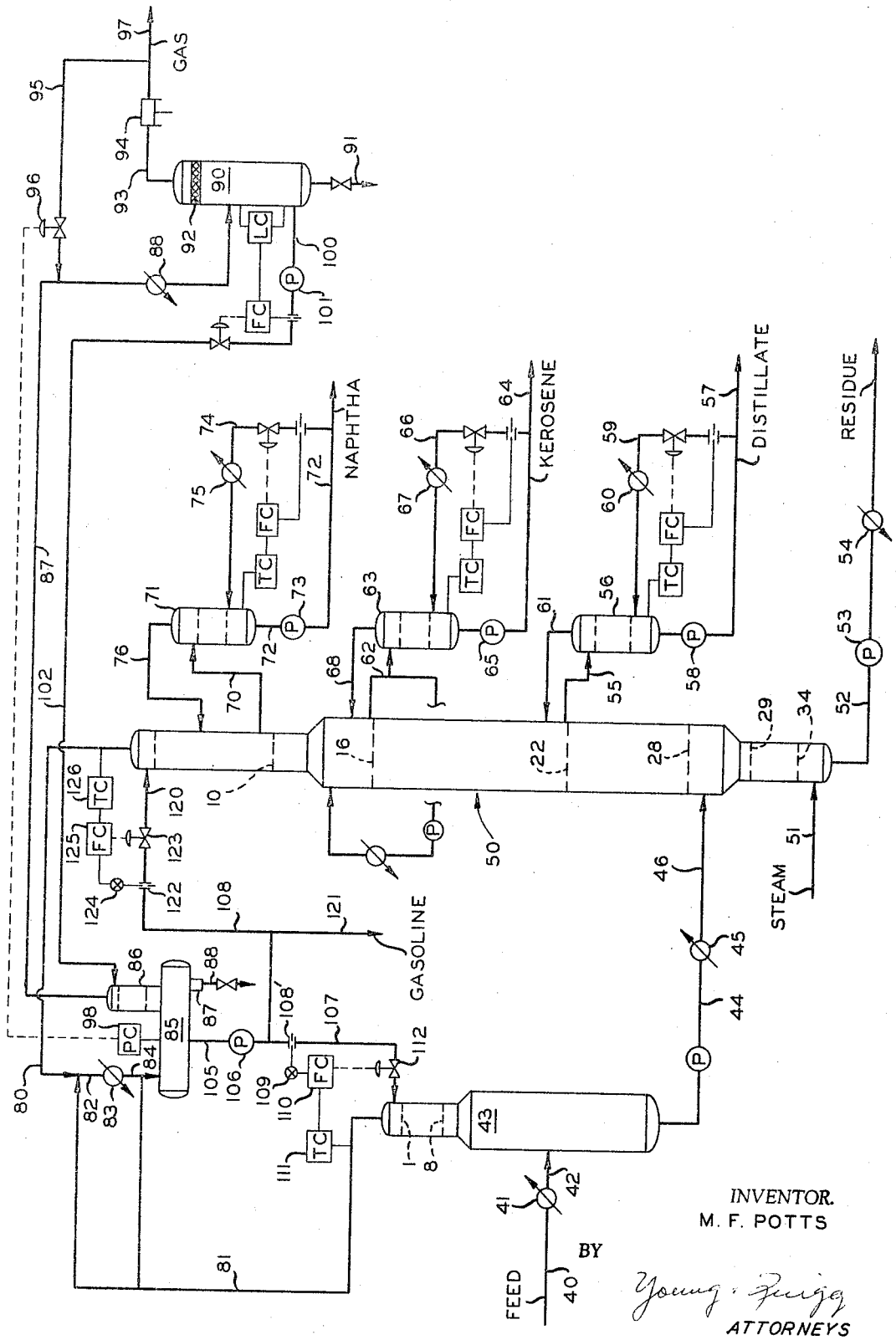

3,320,158
Patented May 16, 1967

3,320,158
CRUDE OIL FRACTIONATION METHOD
Mack F. Potts, Bartlesville, Okla., assignor to Phillips Petroleum Company, a corporation of Delaware
Filed Nov. 6, 1964, Ser. No. 409,406
7 Claims. (Cl. 208—358)

This invention relates to a fractionation method and apparatus therefor. In one of its aspects, it relates to the fractionation of a crude oil feedstock. In another of its aspects it relates to the fractionation of a crude oil feedstock wherein the feed is passed first to a pre-flash tower and separated into an overhead stream and a bottom stream. The bottom stream is passed to a fractionating column and the overhead vapors from said fractionating column are combined with the overhead from the pre-flash tower, condensed and a portion of the condensed overhead used as reflux in the pre-flash tower and in the fractionating column. In still another of its aspects, the invention relates to the fractionation of a feedstock wherein the feed is passed first to a pre-flash tower for separating into overhead and bottom streams. The bottom is passed to a fractionating column for separation into a plurality of product streams including an overhead stream. The overhead from the fractionating column is combined with the overhead of the pre-flash tower, partially condensed and passed to an accumulator zone. Bottoms from the accumulator zone are in part passed to the pre-flash tower as reflux in the top portion thereof, in part passed to the fractionating column for reflux in the top portion thereof, and a remaining portion of the bottoms of said accumulator being drawn off as a product stream. Non-condensed vapors in said accumulator are taken overhead and passed to a cooling zone and a compressor surge drum wherein additional vapors condense, which condensed vapors are passed back into countercurrent flow with the rising vapors inside said accumulator zone and any remaining non-condensed vapors are drawn off to further use.

In a conventional distillation process, a feedstock is fed directly to a distillation or fractionation column where vapors rise through the column in countercurrent relationship to falling or descending liquid through a plurality of contact trays, whereby feedstock is separated into relatively narrow boiling range fractions which are drawn off as product streams. When the feedstock contains a high proportion of low boiling range components and normally gaseous components, there is a tendency for these components which are vaporous in the fractionating column to vapor load the column, thus reducing the efficiency and daily throughput. To overcome this, resort has been made to a pre-flash tower operating at somewhat lower temperatures which removes the lower boiling and normally gaseous components before the remaining higher boiling components are passed to the fractionating column. This latter practice also has disadvantages in that the pre-flash tower does not make an accurate separation and higher boiling components which are not desired in the overhead stream can be, and frequently are, carried over with the overhead vapors from the pre-flash tower. If a narrow boiling range product such as gasoline is required from the overhead of the pre-flash tower, it is then necessary to further process this overhead to obtain the desired narrow boiling range product. I have now discovered that by combining the overhead from a pre-flash tower and a fractionating tower and condensing the same and using the condensate thereof as reflux in each of the vessels, that the over-all efficiency of the system is improved and the desired narrow boiling range product is obtained from the overhead of the respective vessels.

Accordingly, an object of my invention is to provide an improved distillation process and apparatus therefor. Another object of my invention is to provide a distillation process and apparatus therefor wherein a pre-flash tower and a distillation column are used in a series-parallel relationship whereby maximum efficiency of operation is obtained. Still another object of my invention is to provide a distillation process and apparatus therefor wherein the pre-flash tower and a distillation column are employed in a series-parallel relationship and the overhead from the pre-flash tower and the distillation column, combined in a novel manner, provide reflux for each of said vessels. Other objects, advantages, and features of my invention will be readily apparent to those skilled in the art from the following description, the drawing, and the appended claims.

According to the invention, a feedstock is fed to a pre-flash tower wherein low boiling components are withdrawn as an overhead stream and the higher boiling components are withdrawn as bottoms and fed to a distillation column. In the distillation column, steam is used as a stripping medium and at various points along the length of the column there are withdrawn a naphtha stream, a kerosene stream, a heating distillate stream, and as a bottoms there is withdrawn a residue or reduced crude stream. Also, there is taken overhead from the distillation column an overhead stream which is combined with the overhead from the pre-flash tower, cooled and partially condensed and separated in an accumulation zone into a gaseous stream and a bottoms liquid stream. The bottoms liquid stream from the accumulation zone is separated into three streams, the first of which is used as reflux in the pre-flash tower, the second as reflux in the top portion of the distillation column, and the remaining or third stream is withdrawn as a gasoline product stream. Uncondensed vapors from the accumulation zone are withdrawn, cooled, and passed to a surge drum where some of the vapors are condensed and returned as a countercurrently flowing liquid stream in an upper portion of the accumulation zone to stabilize gaseous components flowing therethrough.

Referring to the single figure drawing, and using a specific example to illustrate the process, a hydrocarbon crude oil feedstock having an API gravity of 45.8 is passed at the rate of 125,000 barrels per stream day (b.p.s.d.) via conduit 40 to a conventional heater 41 where the feedstock is at least partially vaporized and raised to a temperature of 432° F., from whence it is passed by conduit 42 into pre-flash chamber 43.

Pre-flash tower 43 can comprise a 10' x 20' top section and a 13' x 18' bottom section. As illustrated, the feed to the pre-flash tower is introduced into a central portion of the bottom section. The upper section of pre-flash tower 43 can contain perforated trays, bubble-cap trays, plate trays, or other means for effecting intimate contact between countercurrent flowing liquid and vaporous streams. As illustrated, pre-flash tower 43 contains eight plate type tray members, two of which are shown at 1 and 8. In tower 43, the feed is separated into an overhead vapor stream and a bottom or flashed crude stream.

The bottoms from tower 43 comprising 104,376 b.p.s.d. having an API gravity of 41.8 and a temperature of 425° F. is drawn off via conduit 44 and passed to a heater 45 where the temperature is raised to 725° F. and 69 liquid volume percent of the stream is vaporized. The partially vaporized stream from heater 45 is passed by way of conduit 46 into a fractionator 50. Fractionator 50 can comprise an 18' diameter upper section 32' in length; a 21' diameter middle section 32' in length; and a lower or reduced crude stripper section 8' in diameter by 20' in length. Fractoinator 50 can contain perforated trays, bubble-cap trays, plate trays, or other means for effecting intimate contact between countercurrent flowing liquid and vaporous streams, and, as illustarted, fractionator 50 contains thirty-four plate-type trays. Representative trays in fractionator 50 are shown by dashed lines as at 10, 16, 22, 28, 29 and 34.

The partially vaporized stream entering fractionator 50 via conduit 46 is introduced below tray 28 where the vapor portion rises upwardly in countercurrent contact with descending liquid. The liquid portion of the stream entering fractionator 50 descends to the lower portion of the vessel and this liquid portion is contacted by rising steam which enters the vessel at a rate of 17,600 pounds per hour below tray 34 being introduced by conduit 51. A reduced crude is withdrawn from the bottom of fractionator 50 by way of conduit 52, pump 53, and is passed through a cooler 54 before passing on to storage. The reduced crude or residue has a gravity of 32.4° API and is drawn off at the rate of 33,622 b.p.s.d.

A bottom side stream is taken off from fractionator 50 at tray 22 by way of conduit 55 to stripper 56 where it enters at a temperature of 635° F. above the top tray of the stripper. A bottom stream comprising heating distillate is drawn off from the bottom of stripper 56 by way of conduit 57 and pump 58 where the majority of the stream is passed to storage. The stream passing to storage is a heating distillate having a gravity of 41.2° API and is drawn off at the rate of 25,750 b.p.s.d. A portion of the bottom stream is led back by way of conduit 59 and passed through a heater 60 for return to stripper 56 to act as a stripping medium. Overhead vapors are taken from stripper 56 by way of conduit 61 and returned to fractionator 50.

A middle side stream is taken off fractionator 50 at tray 16 by way of conduit 62 and is passed into a middle side stream stripper 63. The liquid portion of the middle side stream passes down through suitable contact trays and is drawn off at the bottom by way of conduit 64 and pump 65, where a majority of the stream is passed on to suitable storage. The bottoms of stripper 63 comprise a kerosene fraction having a gravity of 46.6° API and are drawn off at the rate of 24,374 b.p.s.d. A portion of the kerosene bottoms is returned by way of conduit 66 and heater 67 to stripper 63 to serve as a stripping medium in the vessel. Overhead vapors from stripper 63 are returned to fractionator 50 by way of conduit 68.

A top side stream is drawn off fractionator 50 by way of conduit 70 and passed to a stripper 71. The liquid portion of this side stream falls through suitable contact trays and is drawn off as a naphtha stream by way of conduit 72 and pump 73 where a majority of the stream goes to suitable storage. The naphtha stream going to storage has a gravity of 53.0° API and is drawn off at the rate of 13,126 b.p.s.d. A portion of the naphtha bottoms is recycled by way of conduit 74 and heater 75 to stripping vessel 71 to act as a stripping medium. Overhead vapors from vessel 71 are returned to fractionator 50 by way of conduit 76.

The top portion of fractionator 50, for example at the top tray, operates at 320° F. and at a pressure of 32 p.s.i.g. The vapors above the top tray comprising normally gaseous components and low boiling gasoline components are drawn off by way of conduit 80 for passage to an accumulator to be described hereinafter. The top portion of pre-flash tower 43 also operates at a temperature of 320° F. and at a presusre of 32 p.s.i.g. Vapors from tower 43 are drawn off by way of conduit 81 and are mixed with the vapors from conduit 80 and conduit 82. These vapors are cooled in cooler 83 and are passed by way of conduit 84 to accumulator 85.

Accumulator 85 can have a diameter of 15' and a length of 38'. It is provided with a stabilizer section 86 having a diameter of 3' and a height of 14'. Stabilizer section 86 is provided with six contact trays, two of which are indicated by dashed lines. Accumulator 85 is also provided with a water leg 87 where water collects and this water is drawn off by means of valve conduit 88 to suitable disposal. The vapors in conduit 82 are partially condensed by cooler 83 and enter the accumulator 85 at a temperature of 135° F. and 17 p.s.i.g. Accumulator 85 operates as a three-phase system. One phase being the water which has been condensed from the steam used in fractionator 50; a second phase being a gasoline fraction condensed from the overhead vapors, and a gaseous phase which has not yet been condensed. The gaseous phase rises through stabilizer 86 and is drawn off by way of conduit 87 and passes by way of cooler 88 to a compressor suction drum 90.

Compressor suction drum 90 operates at a pressure of 13 p.s.i.g. and a temperature of 90° F. Suction drum 90 is provided with a valved conduit 91 for drawing off any water that may collect in the bottom thereof and is also provided with a demister pad 92 which collects liquid that may be carried by the vapors and returns the liquid to the vessel. Vapors passing through the demister are drawn off the top of vessel 90 by way of conduit 93 and are compressed by compressor 94. At least a portion of the vapors discharged from compressor 94 is returned by way of by-pass conduit 95 and valve 96 to conduit 87. Any remaining vapors are discharged from the system by way of conduit 97. The vapors discharged through conduit 97 are a gas suitable for use as a fuel which gas is discharged at a temperature of 135° F. and a pressure of 60 p.s.i.g. The volume of this gas varies from 0 to 1580M c.f. per day. Valve 96 is regulated to more fully open or close by a pressure recorder controller 98 which senses pressure in accumulator 85 as shown. Thus, the amount of recycle gas flowing through conduit 95 is adjusted by the pressure in accumulator 85 and the quantity of recycle gas will be decreased when the pressure in the accumulator rises and will be increased when the pressure in the accumulator falls.

Cooler 88 condenses a portion of the hydrocarbon vapors passing to suction drum 90 and these condensed vapors are drawn off by way of conduit 100 and passed through pump 101 to conduit 102 which discharges the liquid above the top tray of stabilizer 86. This liquid then passes downwardly through the trays of the stabilizer section to scrub additional liquid components from the vapors rising therethrough.

The gasoline phase in accumulator 85 is drawn off by way of conduit 105 and is pumped by pump 106 into conduits 107 and 108. The liquid stream flowing in conduit 107 is discharged into the top of pre-flash tower 43 to serve as a reflux liquid for the pre-flash tower. The rate of reflux to the top of tower 43 is 8,472 b.p.s.d. Flow rate of reflux fluid in conduit 107 is determined by orifice 108', flow transmitter 109, and this rate is passed to a flow recorder controller 110. The temperature of vapors leaving tower 43 is sensed by temperature recorder controller 111, and converted to a signal which is also passed to flow rate controller 110. The signals from the flow transmitter and the temperature recorder controller are combined in the flow rate controller 110 to regulate the opening of valve 112. If the temperature of the vapors in conduit 81 start to rise to above a preselected value, the controller 111 resets controller 110 to demand more flow of liquid reflux through valve 112 to tower 43.

The fluid passing in conduit 108 is split into two streams 120 and 121. The stream 121 is a gasoline fraction which is passed to storage. This gasoline fraction has a gravity of 57.1° API and is passed to storage at the rate of 28,128 b.p.s.d. The portion of the stream from conduit 108 which passes through conduit 120 amounts to 45,360 b.p.s.d. Conduit 120 is provided with an orifice 122 and control valve 123. Rate of flow through orifice 122 is sensed by flow transmitter 124 and the signal derived therefrom is fed to flow rate controller 125. Also, the temperature of the gases in conduit 80 is sensed by a temperature recorder controller 126 which converts this temperature to a signal fed to flow rate controller 125. If the temperature sensed by controller 126 starts to rise to above a preset value, the controller 126 resets controller 125 to demand more flow of liquid reflux through valve 123 to tower 50.

Overhead 80 from fractionator 50 is a closely controlled boiling range product. The use of a high reflux into the top of fractionator 50 enhances the purity of the overhead product as does the top side stream stripper 71 which operates to return gasoline components to fractionator 50, which gasoline components will be contained in the overhead 80. Because overhead 80 contains only the desired gasoline components and non-condensable gas when it is added to the overhead 81 from the tower 43, the condensate accumulating in accumulator 85 is of a composition such as is desired in the ultimate gasoline product. The portion of the gasoline product fed back to the tower 43 by way of conduit 107 serves to reflux tower 43 and thus improve the characteristics of the vapors coming off the top of that tower.

The novel concept of taking vapors from a pre-flash and a fractionating tower and combining the same to provide a reflux stream of identical composition to the pre-flash tower and to the top of the fractionator results in an advantageous relationship heretofore unknown. A pre-flash tower operated without my invention would result in a rather rough cut of gasoline vapors emerging from the top of the vessel. However, by combining the overhead from tower 43 with the overhead from fractionator 50 as described earlier, it is possible to operate the top of tower 43 so that the overhead contains substantially only those components desired in the ultimate gasoline product which is drawn off at conduit 121.

feed is passed first to a pre-flash zone for separation into an overhead stream and a bottom stream, the bottoms are then passed to a distillation column for separation into a plurality of product streams including an overhead, which overhead is combined with the overhead from the said pre-flash tower, partially condensed, passed to an accumulation zone where vapors are drawn off overhead and condensed liquid is drawn off from the bottom of said accumulation zone, said accumulated bottoms then being used as reflux in the top portion of the pre-flash tower and in the top portion of the distillation column with any remaining portion being passed to further use as a gasoline product stream.

I claim:
1. A process which comprises
   (a) passing a separable crude oil feed to a pre-flash zone having trays at least in the upper portion thereof;
   (b) obtaining an overhead stream from said pre-flash zone;
   (c) obtaining a bottoms stream from said pre-flash zone;
   (d) passing said bottoms stream to a distillation zone;
   (e) in said distillation zone, separating said bottoms stream into a plurality of product streams including an overhead product;
   (f) combining said overhead product with said overhead stream, at least partially condensing said combined overhead product and said overhead stream to obtain a condensate;

TABLE I

| Condition | Stream Number | | | | | | | | | | | | | | | |
|---|---|---|---|---|---|---|---|---|---|---|---|---|---|---|---|---|
| | (42) | (46) | (51) | (52) | (81) | (80) | (121) | (72) | (64) | (57) | (108′) | (120) | (102) | (74) | (66) | (59) |
| Pounds/Hour | | | 17,600 | | | | | | | | | | | | | |
| Barrels/Hour | 125,000 | 104,376 | | 33,622 | 20,624 | 7,504 | 28,128 | 13,126 | 24,374 | 25,750 | 8,472 | 45,360 | 1,250 | 6,338 | 11,026 | 10,680 |
| API at 60° F | 45.8 | 41.8 | | 324 | | | 57.1 | 53.0 | 46.6 | 41.2 | 57.1 | 57.1 | 107 | 53.0 | 46.6 | 41.2 |
| Average Temperature, °F | 432 | [1] 725 | | 710 | 320 | 320 | 100 | 110 | 130 | 150 | 135 | 135 | 90 | [2] 467 | [2] 573 | [2] 700 |
| Liquid Vol. Percent Vapor | | 69 | | | | | | | | | | | | | | |

[1] Feed at 725° F.
[2] After heating.

TABLE II

| Condition | Unit Number | | | | | | | |
|---|---|---|---|---|---|---|---|---|
| | (43) | (85) | (86) | (50) | (71) | (63) | (56) | (90) |
| Top Temp., °F | 320 | | 107 | 320 | 412 | 505 | 635 | |
| Bottom Temp., °F | 425 | | | 710 | 432 | 535 | 665 | |
| Top Pressure, p.s.i.g | 32 | | 16.5 | 32 | | | | |
| Bottom Pressure, p.s.i.g | | | | 36 | | | | |
| Average Temp., °F | | 135 | | | | | | 90 |
| Average Pressure, p.s.i.g | | 17 | | | 31 | 32 | 33 | 13 |

Although the illustrated embodiments of this invention refer to the use of a hydrocarbon oil, it is to be understood that this invention is not limited to such oil, but is applicable to the distillation and fractionation of any distillable or fractionable material such as, for example, vegetable, mineral, and animal oils, and distillate organic and inorganic chemical mixtures or solutions. It is also to be understood that the drawing hereinafter described is diagrammatic and can be altered in many respects by those skilled in the art in possession of this disclosure and yet remain within the intended scope of this invention.

Reasonable variation of the invention as set forth in the drawing, specification and claims will be apparent to one skilled in the art, the essence of which is that there are provided both method and apparatus for the separation of a feedstock into various product streams wherein the (g) passing at least a portion of said condensate to the top tray of said pre-flash zone as reflux therefor and another portion of said condensate to the top of said distillation zone as reflux therefor; and
   (h) recovering as a product of the process any remaining condensate.
2. A process which comprises
   (a) passing a multi-component hydrocarbon feed stream to a pre-flash zone;
   (b) in said pre-flash zone, separating said feed into an overhead stream and a bottoms stream;
   (c) passing said bottoms stream to a distillation zone and in said distillation zone separating said bottoms stream into a plurality of product streams including an overhead product stream;

(d) combining the said overhead stream and the said overhead product stream and passing the said combined stream to a condensing zone;
(e) in said condensing zone, partially condensing the said combined stream to obtain a condensate stream and an uncondensed stream;
(f) passing at least a portion of the said condensate stream to the top of said pre-flash zone as reflux therefor and another portion of said condensate to the top of said distillation zone as reflux therefor;
(g) passing said uncondsensed stream to a cooling zone and thence to a surge zone;
(h) compressing the uncondensed gases leaving said surge zone;
(i) passing at least a portion of said compressed gases to a point of utility;
(j) and recycling the remainder of said compressed gases to the said surge zone whereby the pressure in said surge zone is maintained at a desired level.

3. The method of claim 2 including the further steps of sensing pressure in the said condensing zone and generating a signal representative thereof and utilizing said signal to control the volume of compressed gases recycled to said surge zone.

4. The method according to claim 2 further comprising the steps of collecting in said surge zone additional condensate and returning said additional condensate to said condensing zone in countercurrent flow to said uncondensed stream.

5. A process according to claim 2 further comprising the steps of
(a) sensing the temperature of said overhead stream and generating a signal representative thereof;
(b) sensing the rate of flow of said reflux to said pre-flash zone, and generating a signal representative thereof;
(c) combining the signals derived in steps (a) and (b) above and utilizing the thus combined signal to control the rate of return of reflux to said pre-flash zone.

6. A process according to claim 2 further comprising the steps of
(a) sensing the temperature of said overhead product stream; and generating a signal representative thereof;
(b) sensing the rate of flow of said reflux to said distillation zone, and generating a signal representative thereof;
(c) combining the signals derived in steps (a) and (b) above, and utilizing the thus combined signal to control the rate of return of reflux to said distillation zone.

7. A process for separating a hydrocarbon crude oil feedstock into a plurality of streams having different boiling ranges comprising the steps of
(a) in a pre-flash zone having trays at least in the upper portion thereof, separating the said feed into a stream comprising low boiling components and a stream comprising higher boiling components;
(b) passing the higher boiling point stream through a heater and into a distillation zone;
(c) in said distillation zone, separating the just mentioned stream into a bottoms residue stream, a plurality of side streams, and an overhead stream;
(d) combining the said overhead stream and the said lower boiling point stream, cooling the combined stream, and feeding the said combined stream to an accumulation zone;
(e) in said accumulation zone, collecting a liquid portion condensed in said cooling step;
(f) passing at least a portion of said liquid to the top tray of said pre-flash zone as a reflux therefor;
(g) passing another portion of said liquid to said distillation zone as reflux therefor;
(h) and withdrawing any remaining portion of said liquid as a product of the process.

References Cited by the Examiner

UNITED STATES PATENTS

| | | | |
|---|---|---|---|
| 2,222,276 | 11/1940 | Babcock | 208—355 |
| 2,299,282 | 10/1942 | Schmalenbach | 208—350 |
| 2,327,896 | 8/1943 | Houghland | 208—355 |
| 2,612,464 | 9/1952 | Giachetto et al. | 203—71 |

DELBERT E. GANTZ, *Primary Examiner.*

H. LEVINE, S. P. JONES, *Assistant Examiners.*